US010869345B1

(12) United States Patent
Huang et al.

(10) Patent No.: US 10,869,345 B1
(45) Date of Patent: Dec. 15, 2020

(54) SYSTEMS AND METHODS FOR PROVISIONING DEVICES FOR WLAN

(71) Applicant: Marvell International Ltd., Hamilton (BM)

(72) Inventors: Frank Huang, Dublin, CA (US); Yogesh Powar, Pune (IN); Nishant Sarmukadam, Pune (IN); Amey Dattatray Inamdar, Pashan (IN); Xiaohua Luo, Cupertino, CA (US); James Jan, San Jose, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 673 days.

(21) Appl. No.: 15/097,081

(22) Filed: Apr. 12, 2016

Related U.S. Application Data

(60) Provisional application No. 62/163,040, filed on May 18, 2015, provisional application No. 62/153,241, filed on Apr. 27, 2015.

(51) Int. Cl.
*H04W 72/00* (2009.01)
*H04W 28/00* (2009.01)
(Continued)

(52) U.S. Cl.
CPC ............ *H04W 76/11* (2018.02); *H04H 60/09* (2013.01); *H04L 67/12* (2013.01); *H04W 12/08* (2013.01);
(Continued)

(58) Field of Classification Search
CPC ............................. H04W 48/10; H04W 84/12
(Continued)

(56) References Cited

U.S. PATENT DOCUMENTS 9,220,012 B1    12/2015  Inamdar
2004/0034771 A1  2/2004  Edgett et al.
(Continued)

FOREIGN PATENT DOCUMENTS

WO    WO-2016026429 A1 *  2/2016  ............ H04W 12/08

OTHER PUBLICATIONS

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, the Institute of Electrical and Electronics Engineers, Inc., pp. 1-2695 (Mar. 29, 2012).

(Continued)

*Primary Examiner* — Melvin C Marcelo
*Assistant Examiner* — Natali Pascual Peguero

(57) ABSTRACT

A wireless network interface generates a beacon frame, and transmits the beacon frame outside of a wireless local area network (WLAN) served by an access point (AP). Additionally or alternatively, the wireless network interface receives a first probe request frame from a client station in the WLAN, and in response, generates and transmits a probe response frame outside of the WLAN. The wireless network interface receives one or more frames from the client station of the WLAN, the one or more frames having been transmitted outside of the WLAN. Network security information corresponding to the WLAN is extracted from the one or more frames, and the wireless network interface uses the network security information to wirelessly connect to the AP as part of the WLAN.

32 Claims, 7 Drawing Sheets

(51) Int. Cl.
| | |
|---|---|
| *H04W 76/11* | (2018.01) |
| *H04W 12/08* | (2009.01) |
| *H04W 40/24* | (2009.01) |
| *H04L 29/08* | (2006.01) |
| *H04H 60/09* | (2008.01) |
| *H04W 84/12* | (2009.01) |
| *H04W 88/08* | (2009.01) |

(52) U.S. Cl.
CPC .......... *H04W 40/244* (2013.01); *H04W 84/12* (2013.01); *H04W 88/08* (2013.01)

(58) Field of Classification Search
USPC ................................................ 370/338, 390
See application file for complete search history.

(56) References Cited

U.S. PATENT DOCUMENTS

| | | |
|---|---|---|
| 2005/0021781 A1 | 1/2005 | Sunder et al. |
| 2007/0014267 A1* | 1/2007 | Lam ...................... H04W 48/10 370/338 |
| 2007/0254614 A1* | 11/2007 | Muralidharan ....... H04W 12/04 455/307 |
| 2008/0069105 A1 | 3/2008 | Costa et al. |
| 2008/0123577 A1 | 5/2008 | Jaakkola et al. |
| 2009/0175250 A1* | 7/2009 | Mathur ................. H04W 48/20 370/338 |
| 2009/0252165 A1 | 10/2009 | Zhang et al. |
| 2010/0111054 A1* | 5/2010 | Dhanapal ............ H03M 13/373 370/338 |
| 2011/0058551 A1* | 3/2011 | Fernandez Gutierrez ................... H04L 12/185 370/390 |
| 2011/0149731 A1 | 6/2011 | Gong et al. |
| 2011/0211219 A1 | 9/2011 | Bradley et al. |
| 2012/0008529 A1 | 1/2012 | Averbuch et al. |
| 2012/0099574 A1* | 4/2012 | Tamura .................. H04L 45/36 370/338 |
| 2013/0109314 A1* | 5/2013 | Kneckt .................. H04W 4/80 455/41.2 |
| 2013/0229969 A1 | 9/2013 | Quan et al. |
| 2015/0373510 A1 | 12/2015 | Stojanovski et al. |

OTHER PUBLICATIONS

Chen, "Home Network Basis: Transmission Environments and Wired/Wireless Protocols," Prentice Hall, pp. 1-26 (Jul. 2006).

Hiertz et al., "The IEEE 802.11 Universe," IEEE Communications Magazine, pp. 62-70, (Jan. 2010).

IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).

Perahia et al., "Gigabit Wireless LANs: an overview of IEEE 802.11ac and 80211ad," ACM Sigmobile Mobile Computing and Communications Review, vol. 15, No. 3, pp. 23-33 (Jul. 2011).

"Wi-Fi Peer-to-Peer (P2P) Technical Specification, Version 1.00", Wi-Fi Alliance, pp. 1-135, Dec. 1, 2009.

Specification of the Bluetooth System, Version 2.0: vol. 0, "Master Table of Contents & Compliance Requirements," pp. 1-74; vol. 1, "Architecture & Terminology Overview," pp. 1-92; vol. 2, "Core System Package [Controller Volume]", pp. 1-814; vol. 4, "Core System Package [Host Volume]," pp. 1-250, Nov. 4, 2004.

U.S. Appl. No. 14/566,507, Inamdar et al., "Provisioning Using Multicast Traffic," filed Dec. 10, 2014.

U.S. Appl. No. 15/097,080, Inamdar et al., "Client Association for Provisioning Devices in a Communication Network," filed Apr. 12, 2016.

Reiter, "A primer to Wi-Fi® provisioning for IoT applications," Texas Instruments White Paper, 9 pages (Jul. 2014).

* cited by examiner

700

710 RECEIVE, AT A WIRELESS NETWORK INTERFACE OF CLIENT STATION IN FIRST WIRELESS NETWORK, A BEACON FRAME

720 GENERATE, AT WIRELESS NETWORK INTERFACE OF CLIENT STATION, A PROBE REQUEST FRAME

730 TRANSMIT, WITH THE WIRELESS NETWORK INTERFACE, THE PROBE REQUEST FRAME OUTSIDE OF THE FIRST WIRELESS NETWORK

740 RECEIVE, AT THE WIRELESS NETWORK INTERFACE, A PROBE RESPONSE FRAME

760 TRANSMIT, WITH THE WIRELESS NETWORK INTERFACE, ONE OR MORE FRAMES TO THE APPARATUS OUTSIDE OF THE FIRST WLAN, THE ONE OR MORE FRAMES INCLUDING NETWORK SECURITY INFORMATION

*FIG. 7*

SYSTEMS AND METHODS FOR PROVISIONING DEVICES FOR WLAN

CROSS-REFERENCES TO RELATED APPLICATIONS

This application claims the benefit of U.S. Provisional Patent Application. No. 62/153,241, entitled "WLAN Smart Provisioning," filed on Apr. 27, 2015, and U.S. Provisional Patent Application No. 62/163,040 entitled "SMART CONFIGURATION MODE IN WLAN DEVICE," filed on May 18, 2015, the disclosures of both of which are incorporated herein by reference in their entireties.

FIELD OF THE DISCLOSURE

The present disclosure relates generally to communication networks and, more particularly, to provisioning of devices in wireless local area networks.

BACKGROUND

WiFi networks, such as WiFi networks operating according to one or more of the Institute for Electrical and Electronics Engineers (IEEE) 802.11a, 802.11b, 802.11n, or 802.11ac Standards, are commonly used within homes and businesses. In addition to providing network connectivity to computing devices such as laptop computers and smartphones, these WiFi networks can provide connectivity to various "smart" devices, such as thermostats, water heaters, lighting systems, consumer appliances, security systems, etc. To gain access to the WiFi network, a new device generally must first be "provisioned." Provisioning is a process by which a WiFi-enabled device obtains network credentials that enable secure connection to the wireless network. Once connected, the device can access various services, such as Internet service, through the WiFi access point (AP). As just one example, if a WiFi enabled thermostat is connected to a WiFi network, a user may employ an application running on a smartphone to remotely control the thermostat.

Many devices with built-in WiFi technology, especially for "Internet of Things," do not have user input means (e.g., a touch screen, a keypad, etc.) available for entering the network security credentials.

SUMMARY

In an embodiment, a method of joining a wireless local area network (WLAN) served by an access point (AP) includes at least one of i) and ii): i) a) generating, at a wireless network interface of an apparatus, a beacon frame, and b) transmitting, with the wireless network interface, the beacon frame outside of the WLAN; and ii) a) receiving, at the wireless network interface, a probe request frame from a client station in the WLAN, the probe request frame having been transmitted outside of the WLAN, b) in response to receiving the probe request frame, generating, at the wireless network interface, a probe response frame, and c) transmitting, with the wireless network interface, the probe response frame outside of the WLAN. The method also includes: in response to at least one of i) transmitting the beacon frame, and ii) transmitting the probe response frame, receiving, at the wireless network interface, one or more frames from the client station of the WLAN, the one or more frames having been transmitted outside of the WLAN; and with at least one of i) the wireless network interface and ii) a processor of the apparatus, extracting, from the one or more frames, network security information corresponding to the WLAN; and using, at the wireless network interface, the network security information to wirelessly connect the wireless network interface to the AP as part of the WLAN.

In another embodiment, an apparatus comprises a wireless network interface having one or more integrated circuits. The one or more integrated circuits configured to at least one of i) and ii): i) a) generate a beacon frame, and b) transmit, the beacon frame outside of a wireless local area network (WLAN); and ii) a) receive a probe request frame from a client station in the WLAN, the probe request frame having been transmitted outside of the WLAN, b) in response to receiving the probe request frame, generate a probe response frame, and c) transmit the probe response frame outside of the WLAN. The one or more integrated circuits are further configured to: in response to at least one of i) transmitting the beacon frame, and ii) transmitting the probe response frame, receive one or more frames from the client station of the WLAN, the one or more frames having been transmitted outside of the WLAN. At least one of i) the wireless network interface and ii) a processor of the apparatus, are configured to: extract, from the one or more frames, network security information corresponding to the WLAN, and use the network security information to wirelessly connect the wireless network interface to a AP servicing the WLAN.

In yet another embodiment, a method of assisting an apparatus to join a first WLAN served by an AP includes: generating, at a wireless network interface of a client station in the WLAN, a probe request frame, and transmitting, with the wireless network interface, the probe request frame outside of the WLAN. The method also includes: in response to receiving a probe response frame from an apparatus outside of the WLAN, transmitting, from the wireless network interface of the client station of the WLAN, one or more frames outside of the WLAN. At least one of i) the probe request frame and ii) the one or more frames include network security information, corresponding to the WLAN, to assist the apparatus in wireless connecting to the AP as part of the WLAN.

In still another embodiment, an apparatus comprises a wireless network interface having one or more integrated circuits configured to: generate a probe request frame, and transmit the probe request frame outside of a WLAN served by an AP. The one or more integrated circuits are further configured to: in response to receiving a probe response frame from another communication device outside of the WLAN, transmit one or more frames outside of the WLAN. At least one of i) the probe request frame and ii) the one or more frames include network security information, corresponding to the WLAN, to assist the other communication device in wirelessly connecting to the AP as part of the WLAN.

BRIEF DESCRIPTION OF THE DRAWINGS

FIG. 7 is a flow diagram of an example method for assisting in provisioning a second device for connection to a wireless network, according to an embodiment.

Like reference numbers in the various drawings indicate like elements.

DETAILED DESCRIPTION

In embodiments described below, a first device assists with provisioning a second device by providing the second device with the wireless network credentials. In one embodiment, for example, the first device encrypts wireless network credentials and sends the encrypted wireless network credentials to the second device in one or more wireless communication frames (e.g., in one or more probe requests). The second device then decrypts the network credentials and uses the decrypted network credentials to connect to the wireless network.

Figure 1:
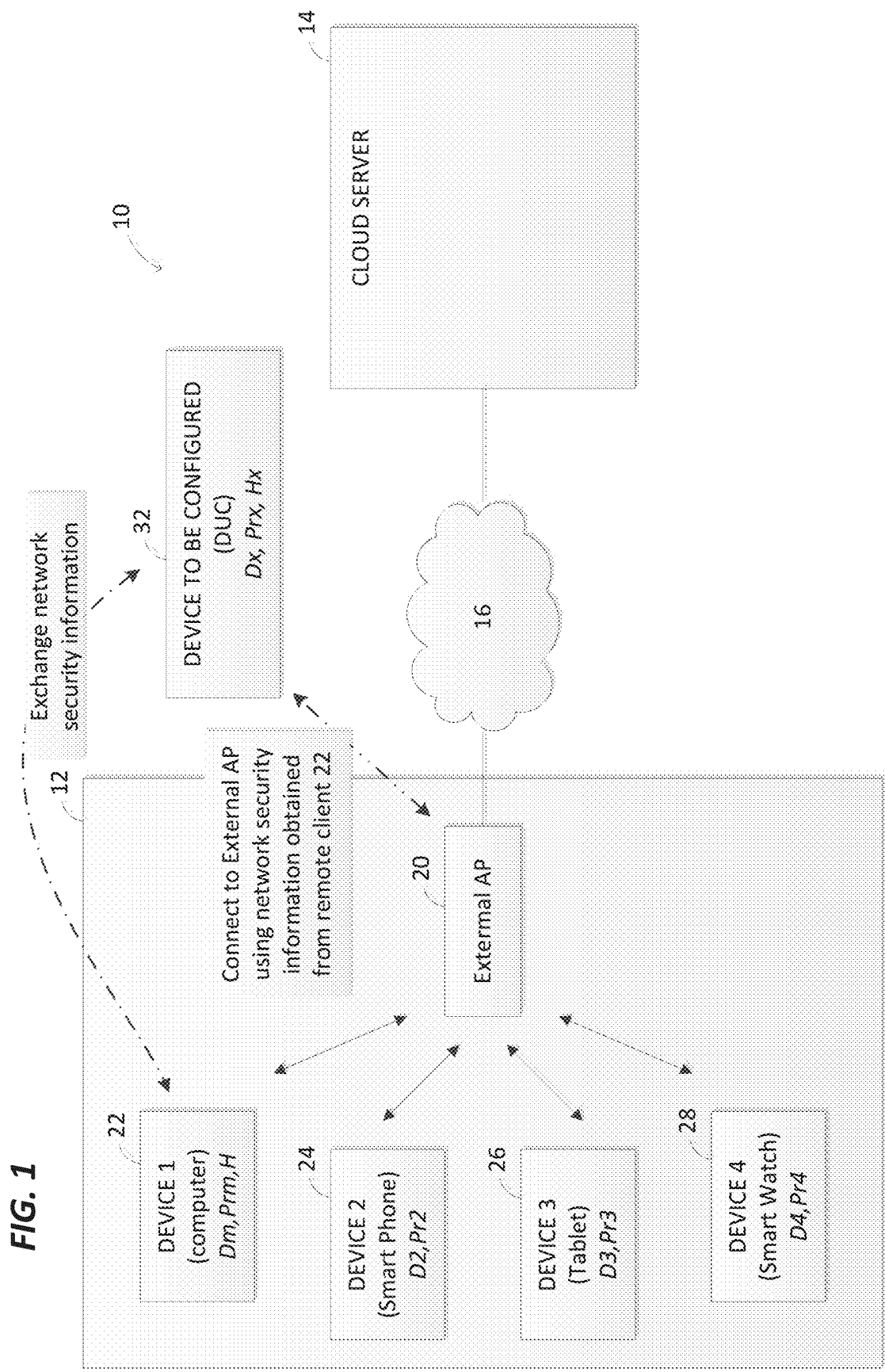
FIG. 1 is a block diagram of an example system in which WiFi network provisioning techniques are implemented, according to an embodiment.

FIG. 1 is a block diagram of an example system 10 in which wireless network provisioning techniques are implemented, according to an embodiment. The example system 10 includes a wireless network 12, a cloud server 14, and a network 16 that communicatively couples the wireless network 12 to the cloud server 14. The wireless network 12 includes an access point (AP) 20 of the wireless network 12, such as a wireless router device. In an embodiment, the AP 20 is communicatively coupled to network 16 via a wired connection or other suitable connection. In the example system 10, the wireless network 12 is a WiFi network, with AP 20 being a WiFi AP. In other embodiments, however, the wireless network 12 is a different suitable type of wireless local area network (WLAN), a wireless personal area network (WPAN), or other suitable type of wireless network.

The wireless network 12 includes a first communication device 22, a second communication device 24, a third communication device 26, and a fourth communication device 28. While each of the communication devices 22, 24, 26 and 28 is shown in FIG. 1 as being within the wireless network 12, in some embodiments, each device is not a part of the wireless network 12 until the device has been properly provisioned and connects to the wireless network 12. That is, in at least some embodiments, one or more of the communication devices 22, 24, 26 and 28 is/are not initially included within the wireless network 12. In the example system 10 of FIG. 1, communication device 22 is a WiFi-enabled laptop, communication device 24 is a WiFi-enabled smart phone, communication device 26 is a WiFi-enabled tablet, and communication device 28 is a WiFi-enabled smart watch. In other embodiments and/or scenarios, however, the wireless network 12 includes different types of WiFi-enabled devices, such as "smart" light control units, security devices, consumer appliances, etc. Moreover, in some embodiments and/or scenarios, the wireless network 12 includes more or fewer than four WiFi-enabled devices.

In an embodiment, each of the communication devices 22, 24, 26 and 28 is associated with a respective device identifier (shown as D1, D2, D3 and D4, respectively, in FIG. 1). In one embodiment, the device identifier is a globally unique identifier such as universally unique identifier (UUID), a media access control (MAC) address, etc. In an embodiment, at least some of the device identifiers are assigned by device vendors. Further, in an embodiment, each of the devices 22, 24, 26 and 28 stores, in a respective memory, a respective private key (shown as Pr1, Pr2, Pr3 and Pr4, respectively, in FIG. 1), each of which corresponds to a corresponding public key (e.g., is a part of a public-private key pair).

The example system 10 further includes a device 32 that is to be provisioned. In an embodiment, the device 32 may be a WiFi-enabled device which is configured to be connected to wireless networks such as the wireless network 12. Non-limiting examples of the device 32 include a WiFi-enabled thermostat, a WiFi-enabled consumer appliance, a WiFi-enabled water heater, a WiFi-enabled spa heater, WiFi-enabled "smart" light control units, WiFi-enabled security devices, etc. In some embodiments, the device 32 may not have a display and/or keypad available to input security credentials for connecting the device to the WiFi network 12.

In some embodiments, the network 16 includes one or more sub-networks. In various embodiments, for example, network 16 includes one or more wired and/or wireless networks (e.g., including routers, bridges, etc.). The cloud server 14 communicates with the AP 20 via the network 16.

The cloud server 14 provides provisioning services to various devices, including one or more devices associated with the WiFi network 12, in an embodiment. In some embodiments, the cloud server 14 includes one or more physical processors (not shown in FIG. 1) that implement server-side operations of the provisioning techniques described herein. In one embodiment, one or more of the physical processors are hardware processors, such as integrated circuits (e.g., application specific integrated circuits (ASICs), programmable logic devices, etc.) or a collection of discrete hardware components, for example. In another embodiment, one or more of the physical processors is/are configured to read and execute software and/or firmware instructions stored on a tangible, non-transitory, computer-readable memory (e.g., a magnetic disk, optical disk, random access memory (RAM), read-only memory (ROM), flash memory, etc.). In some embodiments, the software and/or firmware instructions include machine-readable instructions that, when executed by the processor(s), cause the processor(s) to perform some of the server-side provisioning operations discussed in more detail below (e.g., such as the provisioning operations described below in connection with FIGS. 3-5).

Example structures of devices 22 and 32 are described below in connection with FIG. 2, according to one embodiment, and example methods of operation of devices 22 and 32 are described below in connection with FIGS. 3-5, according to various embodiments. In other embodiments, however, the devices 22, 32 have different suitable structures and/or operate according to other suitable methods.

Figure 2:
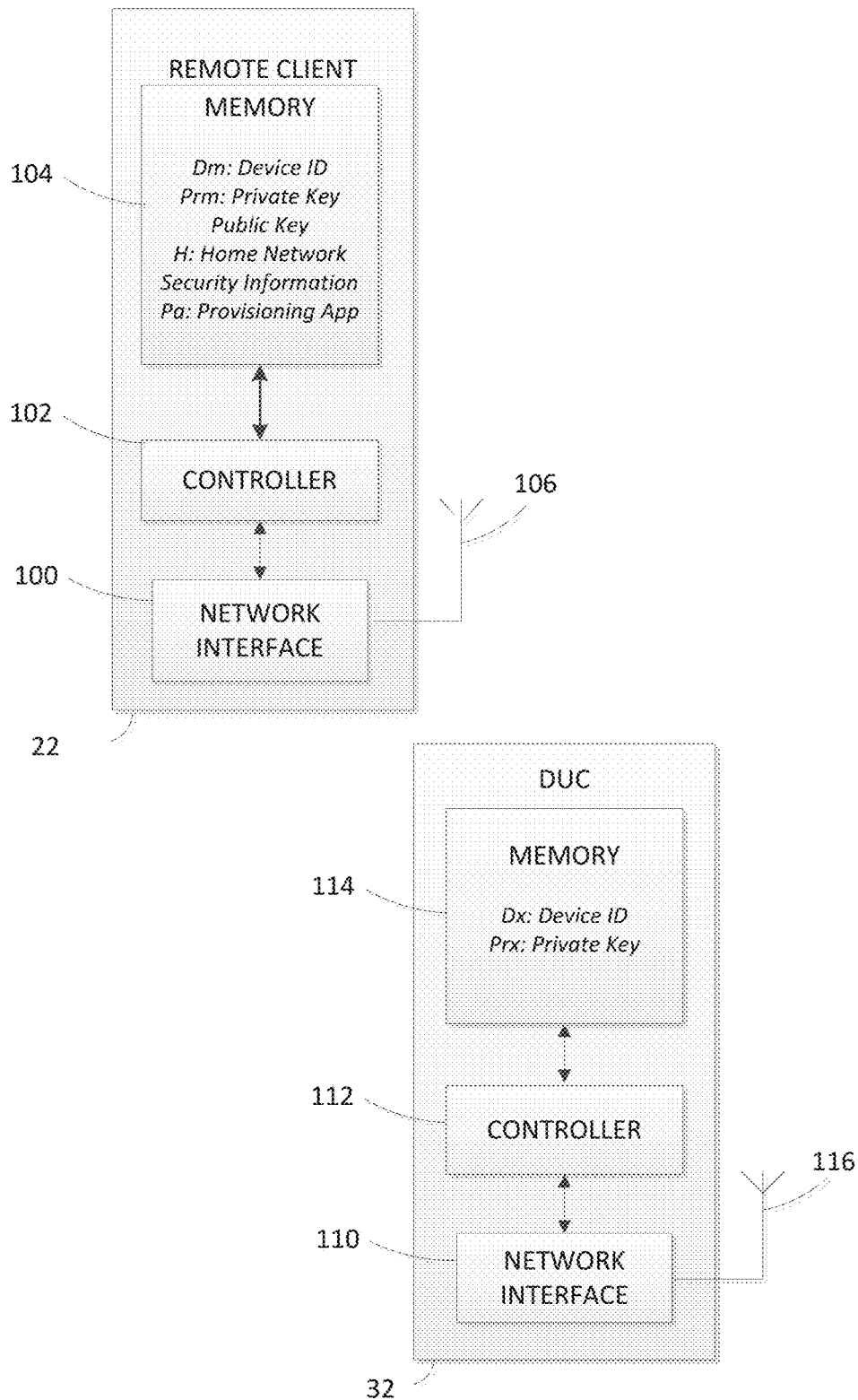
FIG. 2 is a block diagram showing two devices of the example system of FIG. 1 in more detail, according to an embodiment.

FIG. 2 is a block diagram of device 22 and device 32 of the example system 10 in more detail, according to an embodiment. FIG. 2 depicts the devices 22, 32 (i.e., memory content of the devices 22, 32) at a time when device 22 has been provisioned with respect to WiFi network 12, but device 32 has not yet been provisioned with respect to WiFi network 12.

In the example embodiment of FIG. 2, device 22 includes a network interface 100, a controller 102, a memory 104, and one or more antennas 106. The network interface 100 is configured to support WiFi network communications. In one embodiment, for example, the network interface 100 is configured to generate WiFi packets, to cause the generated WiFi packets to be transmitted via antenna(s) 106, and to process (e.g., demodulate and decode) WiFi packets received via antenna(s) 106. The controller 102 communicates with the network interface 100 to support the provisioning techniques described herein. In some embodiments, the network interface 100 is integrated within controller 102. In some embodiments, the controller 102 is integrated within the network interface 100. In other embodiments, the network interface 100 and controller 102 are distinct (e.g., separate integrated circuits).

In some embodiments, the network interface 100 and/or the controller 102 include(s) one or more physical processors (not shown in FIG. 2) that implement operations corresponding to device 22 that are described below in connection with FIGS. 3-5. In one embodiment, one or more of the physical processors are hardware processors, such as integrated circuits (e.g., ASICs, programmable logic devices, etc.) or a collection of discrete hardware components, for example. In another embodiment, one or more of the physical processors is/are configured to read and execute software and/or firmware instructions stored on a tangible, non-transitory, computer-readable memory (e.g., a magnetic disk, optical disk, RAM, ROM, flash memory, etc.). In some embodiments, the software or firmware instructions include machine-readable instructions that, when executed by the processor(s), cause the processor(s) to perform some or all of the operations of device 22 that are described below in connection with FIGS. 3-5.

In the embodiment and scenario of FIG. 2, memory 104 of device 22 stores a device identifier (Dm) and private key (Prm) associated with device 22. Moreover, because FIG. 2 corresponds to a scenario in which device 22 has already been provisioned, memory 104 stores security information/credentials for wireless network 12, denoted as "H" in FIG. 2. In an embodiment, the memory 104 stores a provisioning application (Pa) which is configured to be executed by the controller 102. In various embodiments, memory 104 includes one or more types of memory, such as RAM, ROM, FLASH memory, etc. In an embodiment, however, at least the private key Pr1 is stored in a ROM portion of memory 104 that is fixed at the time of manufacture. In other embodiments, the private key Pr1 is stored in a RAM portion of memory 104, in a FLASH memory, etc.

Device 32 includes a network interface 110, a controller 112, a memory 114, and one or more antennas 116, in the example embodiment of FIG. 2. In an embodiment, network interface 110, controller 112, memory 114, and/or antenna(s) 116 are the same as or similar to network interface 100, controller 102, memory 104, and/or antenna(s) 106, respectively, of device 22. In some embodiments, for example, the network interface 110 and/or controller 112 include(s) one or more physical processors (not shown in FIG. 2) that implement the operations corresponding to device 32 that are described below in connection with FIGS. 3-5.

Similar to memory 104, memory 114 of device 32 stores a device identifier (Dx) and private key (Prx) associated with device 32. In an embodiment, the device identifier Dx may include a MAC address of the device 32 identifying the device 32. In some embodiments, the memory 114 stores a service set identifier (SSID_X) corresponding to the device 32 acting as an access point. In some embodiments, SSID_X is unique to the device 32. In some embodiments, SSID_X is a value that indicates the device 32 is in need of being provisioned for secure access to a wireless network.

Because FIG. 2 corresponds to a scenario in which device 32 has not yet been provisioned, memory 114 does not yet store the security information/credentials H. In various embodiments, memory 114 includes one or more types of memory, such as RAM, ROM, FLASH, etc. In an embodiment, however, at least the private key Pr2 is stored in a ROM portion of memory 114 that is fixed at the time of manufacture. In other embodiments, the private key Pr2 is stored in a RAM portion of memory 114, in a FLASH memory, etc.

In an embodiment, the memory 104 of device 22 stores a public key corresponding to the private key Pr2. In an embodiment, the public key is included in the provisioning application Pa. In another embodiment, the provisioning application Pa obtains the public key from server 14 and stores the public key in the memory 104. For example, in an embodiment, the provisioning application Pa prompts a user to enter (e.g., via a keypad, a keyboard, a touch screen, voice input, etc.) identifying information corresponding to the device 32, such as Dx, SSID_X, or another suitable identifier. For example, a label affixed to the device 32 and/or included in/on packaging of the device 32 may have printed thereon identifying information such as Dx, SSID_X, or another suitable identifier, and the provisioning application Pa prompts the user to enter the identifying information. The provisional application Pa then communicates with the server 14 to obtain the public key from the server using the identifying information. For example, in an embodiment, the provisional application Pa sends the identifying information to the server 14 (e.g., via AP 20 and network 16), and in response receives the public key from the server 14. In an embodiment, the server 14 uses the identifying information to determine a public key corresponding to the private key Pr2 of device 32 from amongst a plurality of public keys stored at the server (or in one or more storage devices communicatively coupled to server 14).

In another embodiment, the provisioning application Pa prompts a user to enter (e.g., via a keypad, a keyboard, a touch screen, voice input, etc.) the public key. For example, a label affixed to the device 32 and/or included in/on packaging of the device 32 may have printed thereon the public key.

Operation of the system 10 will now be described, in accordance with some embodiments, which correspond to the sequence diagrams of FIGS. 3 and 5. In FIG. 3, a second (second from the left-most) vertical timeline corresponds to device 32, an adjacent third vertical timeline corresponds to the AP 20, and a fourth adjacent vertical timeline corresponds to the already provisioned device 22 (remote client station), with time advancing in the downward direction.

Figure 3:
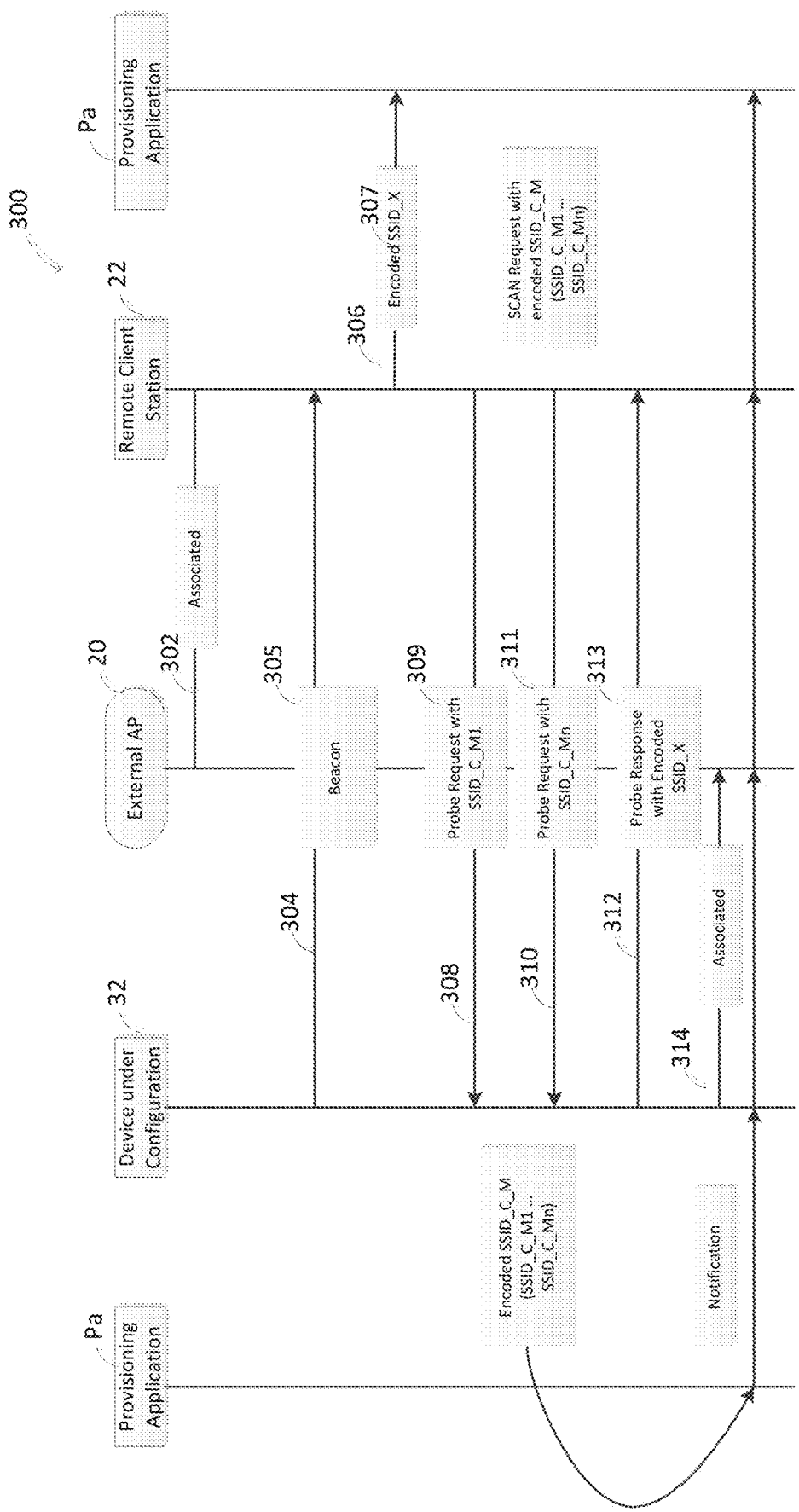
FIG. 3 is a sequence diagram of an example WiFi provisioning method that is utilized in the system of FIG. 1 and/or the devices of FIG. 2, according to some embodiments.

The sequence diagram 300 of FIG. 3 begins at a time when device 32 has not yet been provisioned for connectivity to wireless network 12, and device 22 is not yet associated with the AP 20. At process 302, the device 22 associates with the AP 20 and is connected to the wireless network 12 via the AP 20. Thus, device 22 (but not device 32) initially stores the wireless network credentials H, as shown in FIG. 2. In one embodiment, device 22 was provisioned using a conventional technique, or using any other suitable technique.

The device 32 is powered on and checks a configuration state of the device 32. When the device 32 determines that the device 32 is un-configured for WiFi access, the device 32 enables a smart configuration mode. At process 304, device 32 broadcasts beacons 305 advertising the presence of device 32. In an embodiment, each of the beacons 305 includes an information element containing a device identifier, Dx, of the device 32 retrieved from memory 114. In one such embodiment, the device identifier Dx is included in a vendor-specific information element, which is a size-limited (e.g., 255 bytes maximum) information element allocated within each beacon 305.

The device 32 is configured to transmit the beacons 305 and listen for probe requests sent by one or more other devices in response to the beacons. In some embodiments, the beacons 305 are broadcast periodically. In some embodiments, the device 32 is configured to transmit beacons 305 over different channels and listen for probe requests on the different channels. For example, in an embodiment, the device 32 is preconfigured with a list of one or more channels on which the device 32 is to transmit beacons 305. In an embodiment, the device 32 is configured to transmit a beacon 305 on a channel, and then listen for a probe response on the channel for a preconfigured amount of time; the device 32 then switches to a next channel in the list of channels. If the list includes only one channel, the device 32 transmits all beacons 305 on the one channel, and listens for probe requests on the one channel, in an embodiment. In some embodiments, the beacons 305 include SSID_X and/or Dx.

In an embodiment, the connected device 22 scans one or more channels for beacons 305. In one embodiment, connected device 22 continuously or intermittently scans for beacons 305 during regular operation, and simply continues to perform such scans during, throughout, and/or after the timeline of sequence diagram 300.

In the example scenario of sequence diagram 300, connected device 22 detects one or more of the beacons 305, and in response stops scanning for beacons. In other embodiments, connected device 22 continues to scan for beacons despite having detected one or more of the beacons 305. For example, in some embodiments, connected device 22 continues to scan for beacons from other un-configured devices. After detecting the beacon 305, the connected device 22 uses the device identifier Dx included in the beacon 305 to identify it as corresponding to a particular device 32, as described below.

In an embodiment, the connected device 22 forwards a report 307 to the provisioning application Pa running on the connected device 22. The report 307 includes the device identifier Dx and/or the SSID_X that the connected device 22 had received in beacon 305. At process 306, upon receiving the report 307, application Pa uses the device identifier Dx and/or SSID_X to identify the device 32 as a device needing to be provisioned and/or as a particular device.

At process 308, the connected device 22 encrypts the network security information H (which includes network security information needed to connect to the wireless network 12 via the AP 20, such as an SSID (SSID_AP) of the wireless network 12 and a password needed to connect with the network 12) using, for example, a method such as an example method described below with reference to FIG. 4.

Figure 4:
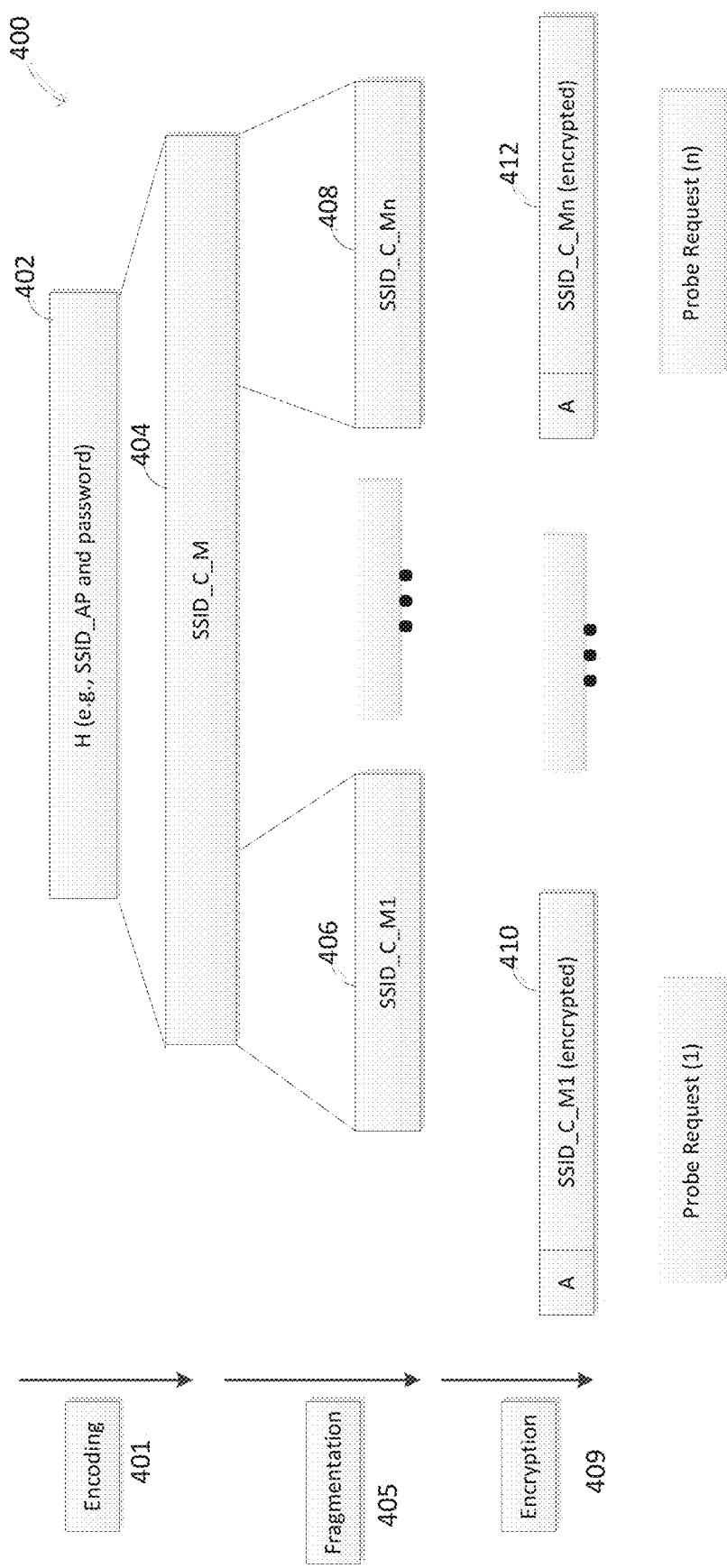
FIG. 4 is a diagram illustrating an example process of generating data units that include encrypted network security credentials, according to an embodiment.

FIG. 4 is a flow diagram of an example method 400 for encoding the network security information 11 for transmission to the device 32, according to an embodiment. At process 401, connected device 22 retrieves the network security information/credentials H 402 (e.g., SSID_AP and password, and/or other suitable security information) from memory 104 and encodes H as a value SSID_C_M 404. In an embodiment, when SSID_C_M 404 is larger than can be included in a single transmission frame (e.g., is larger than a maximum allowed length (i.e., 32 bytes)), SSID_C_M 404 may be fragmented during a fragmentation process 405 into a plurality of fragments SSID_C_M1 (406) . . . SSID_C_Mn (408) as needed. At an encryption process 409, each of the plurality of fragments 406 . . . 408 are encrypted as needed to obtain encrypted fragments SSID_C_M1 (410) . . . encrypted SSID_C_Mn (412). In an embodiment, the encryption may be done with a public Key and/or other information, such as information printed on a label affixed to device 32 and/or include in/on packaging of the device 32. In another embodiment, SSID_C_M 404 is encrypted prior to fragmentation 460.

In an embodiment, the public key is obtained using a technique such as described above. In other embodiments, the public key is obtained using another suitable technique.

In an embodiment, the encrypted fragments 412 are included in respective communication frames for transmission to the device 32. For example, in an embodiment, the encrypted fragments 412 are included in respective probe request frames for transmission to the device 32. In other embodiments, the encrypted fragments 412 are included in other suitable communication frames.

Returning to FIG. 3, at process 308, the connected device 22 transmits one or more probe request messages collectively including the encrypted SSID_C_M 404 to the identified device 32. In an embodiment, each encrypted SSID_C_M1 (410) . . . encrypted SSID_C_Mn (412) is included in a separate probe request message 309, 311 as shown in FIG. 3 at process 308, 310. In the example scenario of sequence diagram 300, device 32 detects one of the probe requests 309, 311, and in response continues scanning for additional probe requests. In an embodiment, device 32 stops scanning for additional probe requests when it determines that the entirety of the encrypted SSID_C_M 404 has been received.

At process 312, the device 32 processes the encrypted SSID_C_M1 (410) . . . encrypted SSID_C_Mn (412) included in the probe request message 309, 311 forwarded by the connected device 22. For example, the device 32 extracts (e.g., including decrypting) the network security information H from the encrypted SSID_C_M1 (410) . . . encrypted SSID_C_Mn (412) and uses H to configure the device 32 for connection to the network 12.

In an embodiment, the device 32 may forward an acknowledgment to the connected device 22 at process 312 via a probe response message 313, the acknowledgment indicating that the device 32 has been configured successfully. However, in other alternative embodiments, the device 32 may not send the acknowledgment to the connected device 22 and process 312 may be omitted. At process 314, the device 32 uses the extracted network security information to connect to the wireless network 12 managed by the AP 20.

Figure 5:
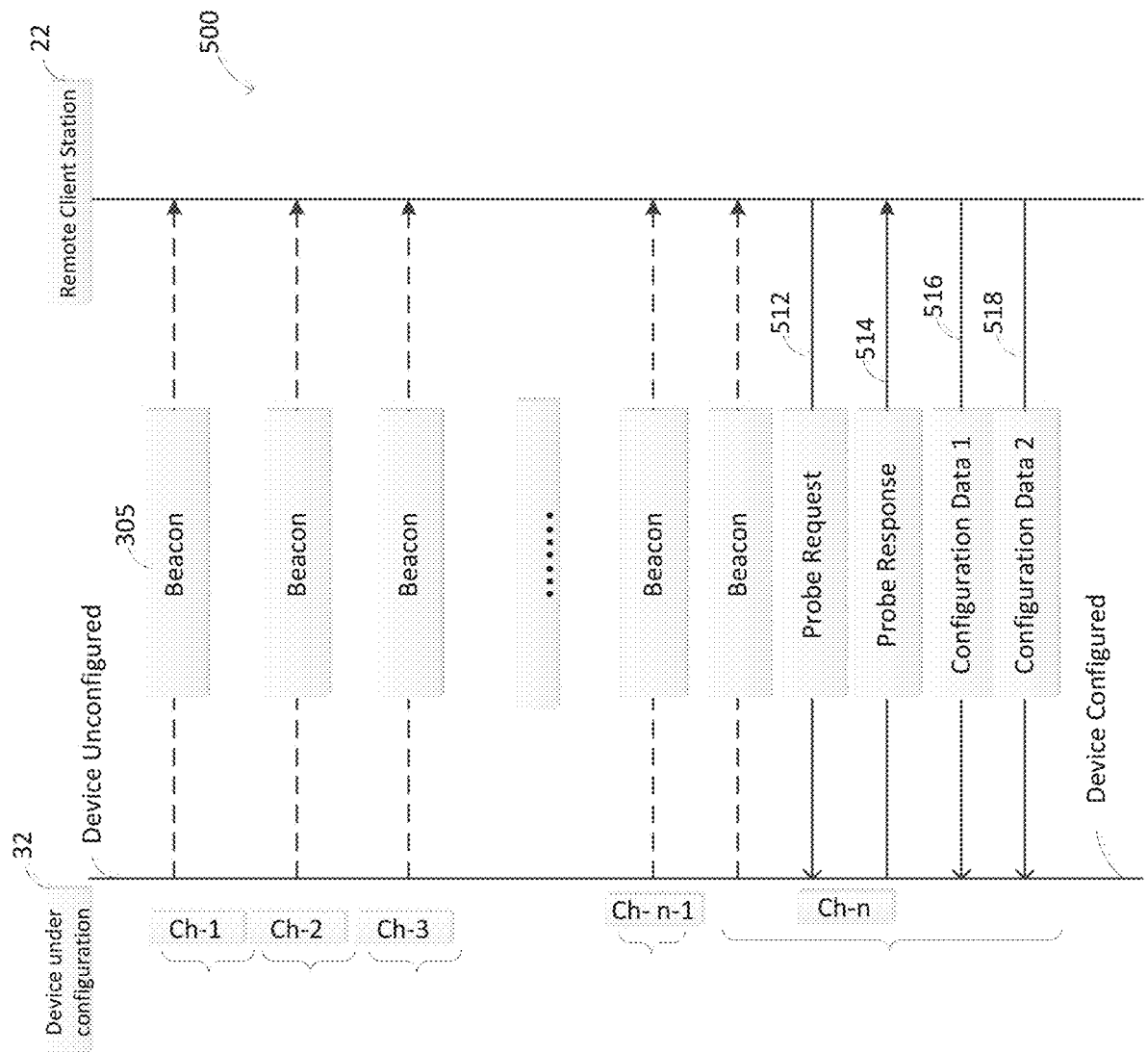
FIG. 5 is a sequence diagram of an example WiFi provisioning method that is utilized in the example system of FIG. 1 and/or the devices of FIG. 2, according to some embodiments.

FIG. 5 is a diagram illustrating a process 500 for configuring the device 32 for secure connection to the network 12, according to another embodiment. Like the sequence diagram 300 of FIG. 3, the sequence diagram 500 of FIG. 5 begins at a time when device 32 has not yet been provisioned for connectivity to network 12, but device 22 has been provisioned, and is connected to the wireless network 12 (and stores the wireless network credentials H as shown in FIG. 2). In one embodiment, device 22 was provisioned using any suitable technique.

In FIG. 5, a first (left-most) vertical timeline corresponds to device 32, a second (right-most) vertical timeline corresponds to the already provisioned device 22 (remote client station), with time advancing in the downward direction.

In an embodiment, the device 32 operates on a plurality of channels Ch-1 ... Ch-n as shown in FIG. 5. Moreover, the device 32 generates a plurality of beacons 305 and broadcasts the plurality of beacons 305 on the plurality of channels. The beacons 305 are configured to advertise a presence of device 32, in some embodiments. In an embodiment, the device 32 is configured to broadcast a beacon 305 on each channel in the plurality of channels, and listen for responses on the channel for a preconfigured period of time before switching the channel to another channel in the plurality of channels. In the example scenario of sequence diagram 500, device 32 detects a probe request 512, and in response stops transmitting additional beacons 305. In other embodiments, device 32 continues to transmit additional beacons despite having detected the probe request 512. In some embodiments, the beacons 305 are broadcast periodically.

In an embodiment, each of the beacons 305 includes an information element containing the device identifier, Dx, of the device 32 retrieved from memory 114. In an embodiment, the device identifier Dx is included in a vendor-specific information element, which is a size-limited (e.g., 255 bytes maximum) information element allocated within each beacon 305.

In an embodiment, the connected device 22 operating at a channel Ch-n listens for beacons 305. In one embodiment, connected device 22 continuously or intermittently listens for beacons 305 on the plurality of channels during regular operation, and simply continues to listen for beacons 305 during, throughout, and/or after the timeline of sequence diagram 500. In the example scenario of sequence diagram 500, connected device 22 detects one of the plurality of beacons 305, and in response stops scanning for beacons. In other embodiments, connected device 22 continues to scan for beacons from other un-configured devices despite having detected one of the plurality of beacons 305. After detecting one of the plurality of beacons 305, the connected device 22 uses the device identifier Dx and/or SSID_X included in the beacon 305 to identify the particular device 32. In an embodiment, in response to receiving the beacon 305, the connected device generates an encrypted SSID_C_M which includes the network security information, as described above with reference to FIGS. 3 and 4.

Returning to FIG. 5, responsive to receiving one of the plurality of beacons 305, the connected device 22 generates and transmits a probe request message 512. In response to the probe request 512, device 32 generates and transmits a probe response 514. In an embodiment, the probe response 514 includes information regarding the device 32. In the example scenario of sequence diagram 500, in response to detecting the probe request 512, the device 512 stops transmitting beacons 305. In other embodiments, device 32 continues, after remaining on channel n for a predetermined amount of time and not receiving configuration information, transmitting beacons 305 and listening for probe requests on multiple channels.

In an embodiment, in response to the probe response 514, the device 22 determines whether to continue with configuring the device 32. In an embodiment, a configuration application running on the device 22 generates a prompt to a user asking the user to confirm that the user wishes to continue with configuring the device 32. In an embodiment, the prompt includes a pop-up box on a display of the device 22. In an embodiment, the prompt includes an audio prompt generated by a speaker of the device 22. In an embodiment, in response to the user confirming that configuration of the device 32 is to continue, the process illustrated in FIG. 5 continues; whereas if the user does not confirm that configuration of the device 32 is to continue, the process illustrated in FIG. 5 stops prior to configuration of the device 32. In other embodiments, prompting of the user is omitted.

In response to receiving the beacon 305 (and optionally in response to receiving the probe response 514, and/or optionally in response to confirmation by the user), the device 22 generates and transmits one or more multicast packets 516, 518 including network security information. In an embodiment, the one or more multicast packets 516, 518 include a multicast address that the device 32 is configured to recognize as corresponding to multicast packets with network security information. In an embodiment, the one or more multicast packets 516, 518 collectively include the encrypted. SSID_C_M 404 described above with reference to FIG. 4. In an embodiment, each encrypted SSID_C_M1 (410) ... encrypted SSID_C_Mn (412) is included in a separate multicast packets 516, 518.

In other embodiments, the network security information is included in one or more packets of another suitable type, such as one or more broadcast packets, probe request messages like the probe request messages 309, 311 as shown in FIG. 3, etc.

Next, the device 32 extracts the configuration data from packet(s) 516, 518 (e.g., from encrypted fragments SSID_C_M1 ... encrypted SSID_C_Mn). The device 32 then uses the network security information to connect to the wireless network 12 serviced by the AP 20.

In embodiments in which one or more multicast packets are utilized to transmit network security information, the network security information is included in media access control (MAC) header(s) of the one or more multicast packets, e.g., in information elements (IE) included in the MAC header(s). In embodiments in which one or more multicast packets are utilized to transmit network security information, the device 22 generates the one or more multicast packets to have one or more multicast addresses that the device 32 is configured to recognize as corresponding to packets having network security information. For example, in some embodiments, the device 32 is configured to determine whether the multicast packet(s) has address(es) in a range that the device 32 is configured to recognize as corresponding to corresponding to packets having network security information. In an embodiment, when the device 32 determines that the multicast packet(s) has an address(es) corresponding to packets having network security information (e.g., is determined to be within a particular range of addresses, is determined match one or more particular addresses, etc.), the device 32 then goes forward with extracting network security information from the packet(s). On the other hand, in an embodiment, when the device 32 determines that the multicast packet(s) does not have an address(es) corresponding to packets having network security information, the device 32 ignores the packet(s).

Similarly, in embodiments in which one or more other types of packets (e.g., broadcast packets, probe request packets, etc.) are utilized to transmit network security information, the network security information is included in a MAC header(s), in a payload, of the one or more packets. In some embodiments, the device 22 generates the one or more packets to have one or more addresses (e.g., broadcast addresses, unicast addresses, etc.) that the device 32 is configured to recognize as corresponding to packets having network security information. In some embodiments, the device 22 is configured to determine an address of the device 32 based on the beacon 305 and/or the probe response 514. The device 22 then includes the address of the device 32 in the packets including network security information.

In some embodiments, the device 32 is configured to determine whether the packet(s) has address(es) in a range that the device 32 is configured to recognize as corresponding to corresponding to packets having network security information. In an embodiment, when the device 32 determines that the packet(s) has an address(es) corresponding to packets having network security information (e.g., is determined to be within a particular range of addresses, is determined match one or more particular addresses, etc.), the device 32 then goes forward with extracting network security information from the packet(s). On the other hand, in an embodiment, when the device 32 determines that the packet(s) does not have an address(es) corresponding to packets having network security information, the device 32 ignores the packet(s).

In some embodiments, when the device 32 determines that the packet(s) has an address of the device 32, the device 32 then goes forward with extracting network security information from the packet(s). On the other hand, in an embodiment, when the device 32 determines that the packet(s) does not have the address of the device 32, the device 32 ignores the packet(s).

In some embodiments, transmission of beacons 305 is omitted. In such embodiments, device 22 is configured to transmit probe requests on a plurality of channels and for listen to probe responses on the plurality of channels. For example, in an embodiment, the device 22 is configured to, on each channel, transmit a probe request and listen on the channel for a probe response for a predetermined period of time. In some embodiments, the device 22 is configured to include in the probe requests an SSID the device 32 is configured to recognize as corresponding to the device 32 and/or corresponding to a configuration process for obtaining network security information. In some embodiments, an SSID (encoded as SSID_X) associated with the device 32 is printed on a label on the device 32, included on packaging associated with the device 32, etc., and an application running on the device 22 is configured to prompt a user to enter the SSID via an input device (e.g., a keypad, a touchscreen, a microphone, etc.) included in or coupled to the device 22. The device 22 then includes the SSID, input by the user, in the probe requests. In some embodiments, an identifier associated with the device 32 is printed on a label on the device 32, included on packaging associated with the device 32, etc., and an application running on the device 22 is configured to prompt a user to enter the identifier via an input device (e.g., a keypad, a touchscreen, a microphone, etc.) included in or coupled to the device 22. The device 22 then transmits the identifier to the server 14 via the AP 20. In response, the server transmits an SSID, corresponding to the device 32, to the device 22. The device 22 then includes the SSID, provided by the server, in the probe requests.

Figure 6:
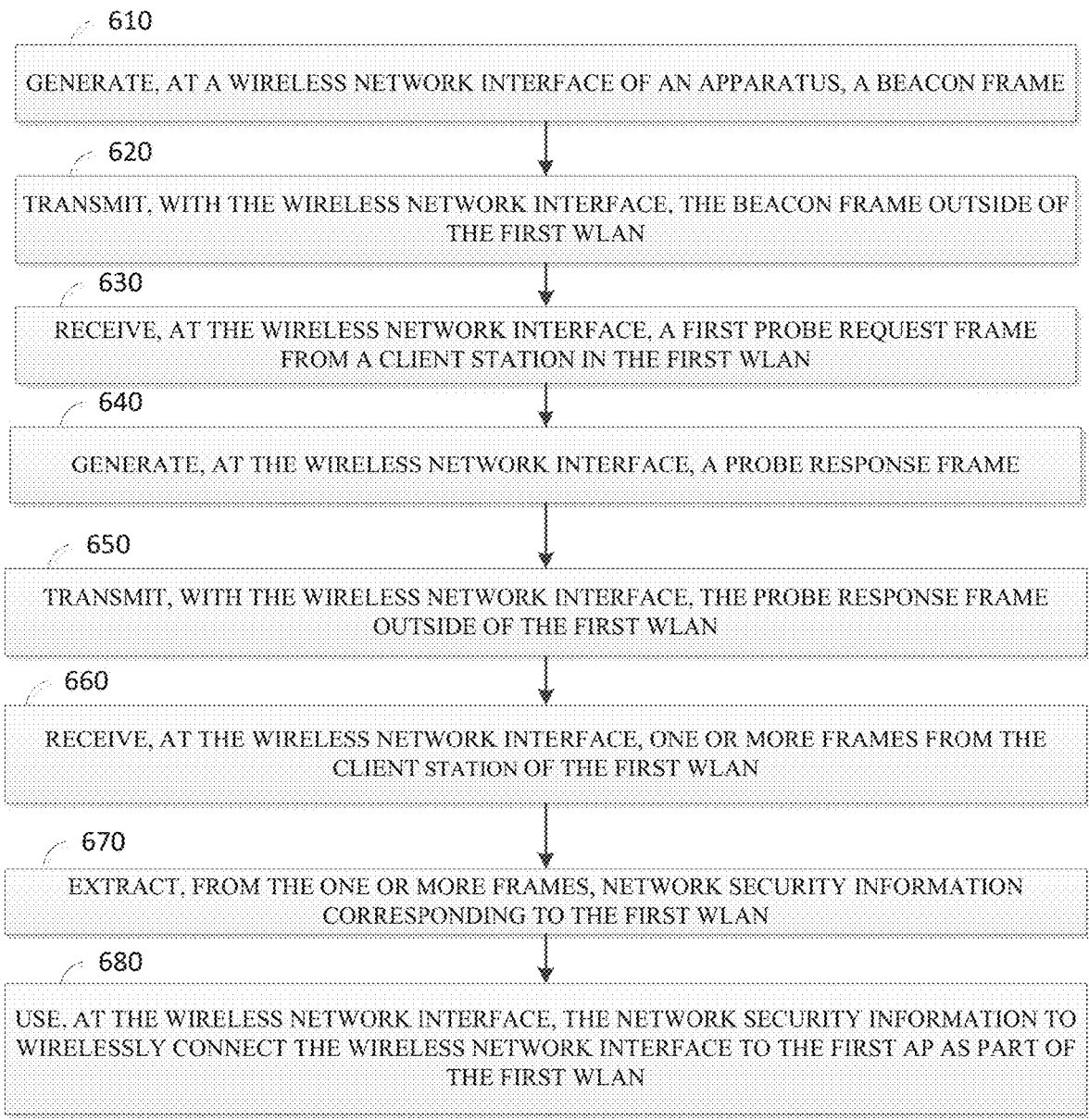
FIG. 6 is a flow diagram of an example method for provisioning a first device for connection to a wireless network with the assistance of a second device already connected to the wireless network, according to an embodiment.

FIG. 6 is a flow diagram of an example method 600 of provisioning a communication device for connection to a first wireless network with the assistance of a client station already connected to the first wireless network, according to an embodiment. In an embodiment, the first wireless network is a WiFi network similar to wireless network 12 of FIG. 1. In other embodiments, the first wireless network is a different, suitable network, such as a non-WiFi WLAN or WPAN.

In an embodiment, the method 600 is implemented in a device similar to or the same as device 32 of FIGS. 1 and 2. More specifically, in some embodiments, the method 600 is implemented by a controller similar to or the same as controller 112 of FIG. 2, and/or by a network interface similar to or the same as wireless network interface 110 of FIG. 2.

At block 610, a beacon frame is generated at the wireless network interface of the apparatus. In some embodiments, the beacon frame in the same as or similar to beacon frame 305 described above with reference to FIGS. 3 and 5. At block 620, the wireless network interface transmits the beacon frame outside of the first wireless network. For example, in an embodiment, the device 32 operates as an access point of a second wireless network, and the beacon frame is transmitted at block 620 as part of the second wireless network. As another example, in an embodiment, the beacon frame is transmitted at block 620 as part of a second wireless network that is a peer-to-peer network, ad hoc network, etc., separate from the first wireless network.

In some embodiments, blocks 610 and 620 are omitted.

At block 630, a first probe request frame from a client station in the first wireless network is received by the wireless network interface. In an embodiment, the first probe request frame is transmitted outside of the first wireless network. In an embodiment, the first probe request frame is transmitted responsive to the beacon transmitted at block 620. In other embodiments, however, block 620 is omitted and the first probe request frame is not responsive to a beacon. At block 640, in response to receiving the first probe request frame, the wireless network interface generates a probe response frame. At block 650, the wireless network interface transmits the probe response frame outside of the first wireless network. In some embodiments, device 32 determines whether the probe request frame received at block 630 is addressed to the device 32 and/or includes information (e.g., an SSID) that indicates that the probe request frame is associated with configuring the device 32 with network security information for connecting to a wireless network. In some embodiments, device 32 transmits the probe response frame at block 650 in response to determining that the probe request frame received at block 630 is addressed to the device 32 and/or includes information (e.g., an SSID) that indicates that the probe request frame is associated with configuring the device 32 with network security information for connecting to a wireless network. If the device 32, however, determines that the probe request frame received at block 630 is not addressed to the device 32 and/or does not include information (e.g., an SSID) that indicates that the probe request frame is associated with configuring the device 32 with network security information for connecting to a wireless network, the device 32 does not transmit the probe response frame at block 650, according to an embodiment.

Next, at block 660, in response to at least one of i) transmitting the beacon frame, and ii) transmitting the probe response frame, the wireless network interface receives one or more frames from the client station of the first wireless network. In an embodiment, the one or more frames are transmitted outside of the first wireless network. In some embodiments, the one or more frames received at block 660 include one or more multicast frames. In some embodiments, the one or more frames received at block 660 include one or more broadcast frames. In some embodiments, the one or more frames received at block 660 include one or more unicast frames. In some embodiments, the one or more frames received at block 660 include one or more probe request frames.

At block 670, at least one of i) the wireless network interface and ii) a processor of the apparatus, extracts, from the one or more frames received at block 660, network security information corresponding to the first wireless network. Next, at block 680, the wireless network interface of the apparatus uses the network security information to wirelessly connect the wireless network interface to the first AP as part of the first WLAN.

In an embodiment, the network security information in the one or more frames received at block 660 includes a service set identifier (SSID) and a credential corresponding to the first AP. In some embodiments, at least some of the network security information received at block 660 is encrypted. In further embodiments, the method 600 further includes (not shown in FIG. 6) decrypting, with at least one of i) the wireless network interface and ii) the processor of the apparatus, the network security information received at block 660.

In an embodiment, the network security information is fragmented into a plurality of portions, and receiving the one or more frames comprises receiving a plurality of frames. In one such embodiment, each frame in the plurality of frames includes a respective portion among the plurality of portions.

In some embodiments, the method 600 further comprises (not shown in FIG. 6) determining, with at least one of i) the wireless network interface and ii) the processor, for each multicast frame, whether an address (e.g., a destination address, a source address, a BSSID, etc.) of a frame received at block 660 corresponds to configuration of the device 32 with network security information. In an embodiment, determining whether an address corresponds to configuration of the device 32 with network security information comprises determining whether the address is within a predetermined range. The method 600, according to an embodiment, further includes, for each frame received at block 660, extracting network security information in response to determining that the address of the frame corresponds to configuration of the device 32 with network security information.

In some embodiments, the method 600 optionally includes (not shown in FIG. 6), in response to connecting the wireless network interface to an AP of the first wireless network using the network security information, transmitting to the client station of the first wireless network, with the wireless network interface, a probe response frame having information indicating that the wireless network interface is connected to the AP of the first wireless network.

In other embodiments, the device comprises any suitable combination of two or more of the above features.

FIG. 7 is a flow diagram of an example method 700, implemented in a client station connected to a first wireless network, of assisting in provisioning an apparatus for connection to the first wireless network, according to an embodiment. In an embodiment, the first wireless network is a WiFi network similar to the wireless network 12 of FIG. 1. In other embodiments, the first wireless local area network is a different, suitable network, such as a non-WiFi WLAN or WPAN, for example. In an embodiment, the method 700 is implemented in a device similar to or the same as device 22 of FIGS. 1 and 2, in order to assist in provisioning a device similar to or the same as device 32 of FIGS. 1 and 2. More specifically, in some embodiments, the method 700 is implemented by a controller similar to or the same as controller 102 of FIG. 2, and/or by a network interface similar to or the same as network interface 100 of FIG. 2.

At block 710, a beacon frame is received at the wireless network interface of the client station, the beacon frame having been transmitted by a device that is seeking to receive network security information for joining the first wireless network to which the client station belongs. In an embodiment, the beacon frame is received outside of the first wireless network. For example, in an embodiment, the beacon frame is transmitted by a device (e.g., device 32) acting as an AP of a second wireless network. In some embodiments, the beacon frame in the same as or similar to beacon frame 305 described above with reference to FIGS. 3 and 5.

In some embodiments, block 710 is omitted.

At block 720, a probe request frame is generated at the wireless network interface of the client station. For example, in an embodiment, the probe request frame is generated responsive to the beacon frame received at block 710. In embodiments in which block 710 is omitted, however, generation of the probe request frame is not responsive to a beacon frame. For example, in some embodiments, a user provides input, via one or more input devices of the client station, that causes the probe request frame to be generated at block 720. In an embodiment, the probe request frame is the same as or similar to the probe request frame 512 of FIG. 5.

At block 730, the wireless network interface transmits the probe request frame outside of the first wireless network. A probe response frame is received at block 740 from the device that is to be configured to join the first wireless network, the probe response frame being responsive to the probe request frame transmitted at block 730. In an embodiment, the probe response frame received at block 740 is received outside of the first wireless network.

In some embodiments, blocks 730 and 740 are omitted.

The wireless network interface of the client station of the first wireless network transmits one or more frames at block 760, the one or more frames including network security information for joining the first wireless network. In an embodiment, the one or more frames are transmitted outside of the first wireless network. In an embodiment, the network security information in the one or more frames includes a service set identifier (SSID) and a password corresponding to the first wireless network. In another embodiment, an additional block not shown in FIG. 7 includes encrypting, with at least one of i) the wireless network interface and ii) a processor of the client station, the network security information.

In an embodiment, the network security information is fragmented into a plurality of portions, and transmitting the one or more frames comprises transmitting a plurality of frames. In one such embodiment, each frame in the plurality of frames includes a respective portion among the plurality of portions. In some embodiments, the one or more frames include one or more multicast frames. In some embodiments, the one or more frames include one or more broadcast frames. In some embodiments, the one or more frames include one or more unicast frames. In some embodiments, the one or more frames include one or more probe request frames.

In an embodiment, transmission of the one or more frames at block 760 is responsive to receiving the probe response frame at block 740. In embodiments in which blocks 730 and 740 are omitted, transmission of the one or more frames at block 760 is responsive to receiving the beacon frame at block 710.

In other embodiments, the device comprises any combination of one or more of the above features.

At least some of the various blocks, operations, and techniques described above may be implemented utilizing hardware, one or more processors executing firmware instructions, one or more processors executing software instructions, or any combination thereof. When implemented utilizing one or more processors executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the one or more processors, cause the one or more processors to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the claims.

The invention claimed is:

1. A method of joining an apparatus to a wireless local area network (WLAN) served by an access point (AP), the method comprising:
    generating, at a wireless network interface of the apparatus, a beacon frame that includes a service set identifier (SSID) corresponding to the apparatus and different from an SSID corresponding to the WLAN served by the AP;
    transmitting, with the wireless network interface of the apparatus and to a client station of the WLAN, the beacon frame outside of the WLAN to prompt the client station of the WLAN to transmit network security information corresponding to the WLAN to the wireless network interface so that the wireless network interface can use the network security information to wirelessly connect the wireless network interface to the AP as part of the WLAN;
    wirelessly receiving, at the wireless network interface and from the client station, one or more frames transmitted from the client station of the WLAN in response to the beacon frame, the one or more frames having been transmitted outside of the WLAN, wherein the one or more frames include the network security information corresponding to the WLAN;
    extracting, from the one or more frames received from the client station, the network security information corresponding to the WLAN using at least one of i) the wireless network interface of the apparatus and ii) a processor of the apparatus; and
    wirelessly associating, at the wireless network interface of the apparatus, with the AP as part of the WLAN using the network security information extracted from the one or more frames received from the client station.

2. The method of claim 1, wherein the network security information in the one or more frames includes the service set identifier (SSID) corresponding to the WLAN served by the AP and a credential corresponding to the WLAN served by the AP.

3. The method of claim 2, wherein:
    the network security information is fragmented into a plurality of portions; and
    receiving the one or more frames comprises receiving a plurality of frames, each frame in the plurality of frames including a respective portion among the plurality of portions.

4. The method of claim 1, wherein:
    at least some of the network security information is encrypted; and
    the method further comprises decrypting, with at least one of i) the wireless network interface and ii) the processor of the apparatus, the network securing information.

5. The method of claim 1, wherein the one or more frames include one or more probe request frames.

6. The method of claim 1, wherein:
    the one or more frames include one or more multicast frames;
    the method further comprises determining, with at least one of i) the wireless network interface of the apparatus and ii) the processor of the apparatus, for each multicast frame whether a corresponding multicast address of the multicast frame is within a predetermined range; and
    extracting network security information comprises, for each multicast frame, extracting network security information in response to determining that the corresponding multicast address of the multicast frame is within the predetermined range.

7. The method of claim 6, wherein:
    the one or more multicast frames include a plurality of multicast frames; and
    the method further comprises, in response to determining that a multicast address of a multicast frame among the plurality of multicasts frames is within the predetermined range,
        stopping transmission, by the wireless network interface of the apparatus, of at least one of i) beacon frames, and ii) probe response frames.

8. The method of claim 1, further comprising:
    in response to connecting the wireless network interface of the apparatus to the AP as part of the WLAN, transmitting to the client station of the WLAN, with the wireless network interface of the apparatus, a second probe response frame having information indicating that the wireless network interface of the apparatus is connected to the AP as part of the WLAN.

9. The method of claim 1, wherein the one or more frames comprise a plurality of frames, and wherein the method further comprises:
    transmitting, with the wireless network interface of the apparatus, a plurality of beacon frames outside of the WLAN on respective channels among a plurality of channels to prompt the client station of the WLAN to transmit network security information corresponding to the WLAN to the wireless network interface of the apparatus so that the wireless network interface can use the network security information to wirelessly connect the wireless network interface of the apparatus to the AP as part of the WLAN;

on each respective channel, listening, with the wireless network interface of the apparatus, for a probe request frame for a first period of time, the probe request frame being responsive to a respective beacon frame, among the plurality of beacon frames, transmitted by the wireless network interface of the apparatus on the respective channel;

in response to the wireless network interface of the apparatus transmitting a first beacon frame on one of the channels, receiving, at the wireless network interface of the apparatus, one of the plurality of frames on the one channel; and in response to receiving, at the wireless network interface of the apparatus, the one of the plurality of frames on the one channel, listening on the one channel for other frames in the plurality of frames for a second period of time that is greater than the first period of time.

10. The method of claim 9, further comprising:
in response to receiving the one of the plurality of frames on the one channel, stopping transmission, by the wireless network interface of the apparatus, of the plurality of beacon frames.

11. An apparatus, comprising:
a processor; and
a wireless network interface having one or more integrated circuits configured to:
generate a beacon frame that includes a service set identifier (SSID) corresponding to the apparatus and different from an SSID corresponding to a wireless local area network (WLAN) served by an access point (AP),
transmit the beacon frame outside of the WLAN to a client station of the WLAN to prompt the client station in the WLAN to transmit network security information corresponding to the WLAN to the wireless network interface so that the wireless network interface can use the network security information to wirelessly connect the wireless network interface to the AP as part of the WLAN,
wirelessly receive one or more frames from the client station of the WLAN, the one or more frames having been transmitted outside of the WLAN and from the client station in response to the beacon frame, and wherein the one or more frames include the network security information corresponding to the WLAN,
extract, from the one or more frames received from the client station, the network security information corresponding to the WLAN using at least one of i) the wireless network interface and ii) the processor, and
wirelessly associate with the AP as part of the WLAN using the network security information extracted from the one or more frames received from the client station.

12. The apparatus of claim 11, wherein the network security information in the one or more frames include the service set identifier (SSID) corresponding to the WLAN served by the AP and a credential corresponding to the WLAN served by the AP.

13. The apparatus of claim 12, wherein:
the network security information is fragmented into a plurality of portions; and the one or more integrated circuits are further configured to receive a plurality of frames, each frame in the plurality of frames including a respective portion among the plurality of portions.

14. The apparatus of claim 11, wherein:
at least some of the network security information is encrypted; and
at least one of i) the wireless network interface of the apparatus and ii) the processor of the apparatus is configured to decrypt the network security information.

15. The apparatus of claim 11, wherein the one or more frames includes one or more probe request frames.

16. The apparatus of claim 11, wherein:
the one or more frames include one or more multicast frames; and
at least one of i) the one or more integrated circuits and ii) the processor are further configured to:
determine, for each multicast frame, whether a corresponding multicast address of the multicast frame is within a predetermined range, and
for each multicast frame, extract network security information in response to determining that the corresponding multicast address of the multicast frame is within the predetermined range.

17. The apparatus of claim 16, wherein:
the one or more multicast frames include a plurality of multicast frames; and
the one or more integrated circuits are further configured to, in response to determining that a multicast address of a multicast frame among the plurality of multicast frames is within the predetermined range, stop transmission of at least one of i) beacon frames and ii) probe response frames.

18. The apparatus of claim 11, wherein the one or more integrated circuits are further configured to:
in response to connecting the wireless network interface of the apparatus to the AP as part of the WLAN, transmit to the client station of the WLAN a second probe response frame having information indicating that the wireless network interface of the apparatus is connected to the AP as part of the WLAN.

19. The apparatus of claim 11, wherein:
the one or more frames comprise a plurality of frames;
the one or more integrated circuits are further configured to:
transmit a plurality of beacon frames outside of the WLAN on respective channels among a plurality of channels to prompt the client station in the WLAN to transmit network security information corresponding to the WLAN to the wireless network interface of the apparatus so that the wireless network interface of the apparatus can use the network security information to wirelessly connect the wireless network interface of the apparatus to the AP as part of the WLAN,
on each respective channel, listen for a probe request frame for a first period of time, the probe request frame being responsive to a respective beacon frame, among the plurality of beacon frames, transmitted by the wireless network interface of the apparatus on the respective channel,
in response to the wireless network interface of the apparatus transmitting a first beacon frame on one of the channels, receive one of the plurality of frames on the one channel, and
in response to receiving the one of the plurality of frames on the one channel, listen on the one channel for other frames in the plurality of frames for a second period of time that is greater than the first period of time.

20. The apparatus of claim 19, wherein the one or more integrated circuits are further configured to:
in response to receiving the one of the plurality of frames on the one channel, stop transmission of the plurality of beacon frames.

21. A method of assisting an apparatus to join a wireless local area network (WLAN) served by an access point (AP), the method comprising:
generating, at a wireless network interface of a client station of the WLAN, a probe request frame that includes a service set identifier (SSID) corresponding to the apparatus and different from an SSID corresponding to the WLAN served by the AP;
transmitting, with the wireless network interface of the client station and to the apparatus, the probe request frame outside of the WLAN to prompt the apparatus to wirelessly transmit a probe response frame outside of the WLAN as part of a procedure to provide the apparatus with network security information corresponding to the WLAN to assist the apparatus to wirelessly connect to the AP as part of the WLAN; and
in response to wirelessly receiving the probe response frame from the apparatus, transmitting, from the wireless network interface of the client station of the WLAN, one or more frames that include the SSID corresponding to the apparatus as part of the procedure to provide the apparatus with network security information corresponding to the WLAN, the one or more frames having been transmitted outside of the WLAN;
wherein the apparatus is located apart from the client station and wirelessly communicates with the client station; and
wherein at least one of i) the probe request frame transmitted by the wireless network interface of the client station and ii) the one or more frames transmitted by the wireless network interface of the client station include the network security information, corresponding to the WLAN, to assist the apparatus in wirelessly connecting to the AP as part of the WLAN.

22. The method of claim 21, wherein the network security information includes the service set identifier (SSID) corresponding to the WLAN served by the AP and a credential corresponding to the WLAN served by the AP.

23. The method of claim 22, wherein:
the network security information is fragmented into a plurality of portions; and
transmitting the one or more frames comprises transmitting a plurality of frames, each frame in the plurality of frames including a respective portion among the plurality of portions.

24. The method of claim 21, wherein the method further comprises encrypting, with at least one of i) the wireless network interface of the client station and ii) a processor of the client station, the network security information.

25. The method of claim 21, wherein:
the one or more frames include one or more multicast frames.

26. The method of claim 21, further comprising:
receiving, at the client station of the WLAN, a probe response frame having information indicating that the wireless network interface of the apparatus is connected to the AP as part of the WLAN.

27. A client station in a wireless local area network (WLAN) served by an access point (AP), the client station comprising:
a wireless network interface having one or more integrated circuits configured to:
generate at the client station a probe request frame that includes a service set identifier (SSID) corresponding to a communication device and different from an SSID corresponding to the WLAN served by the AP, and
transmit the probe request frame outside of the WLAN served by the AP and to the communication device to prompt the communication device to wirelessly transmit a probe response frame outside of the WLAN as part of a procedure to provide the other communication device with network security information corresponding to the WLAN to assist the other communication device to wirelessly connect to the AP as part of the WLAN;
wherein the one or more integrated circuits are further configured to: in response to receiving the probe response frame the communication device, transmit one or more frames that include the SSID corresponding to the communication device outside of the WLAN as part of the procedure to provide the communication device with network security information corresponding to the WLAN;
wherein at least one of i) the probe request frame transmitted by the wireless network interface of the client station and ii) the one or more frames transmitted by the wireless network interface of the client station include the network security information, corresponding to the WLAN, to assist the communication device in wirelessly connecting to the AP as part of the WLAN.

28. The client station of claim 27, wherein the network security information in the at least one of i) the probe request frame and ii) the one or more frames includes service set identifier (SSID) corresponding to the WLAN served by the AP and a credential corresponding to the WLAN served by the AP.

29. The client station of claim 28, wherein:
at least one of i) the wireless network interface and ii) the processor of the client station is further configured to fragment the network security information into a plurality of portions; and
the one or more integrated circuits are configured to: in response to receiving the probe response frame from the communication device, transmit a plurality of frames outside of the WLAN, each frame in the plurality of frames including a respective portion among the plurality of portions.

30. The client station of claim 27, wherein at least one of i) the wireless network interface of the client station and ii) a processor of the client station is further configured to encrypt the network security information.

31. The client station of claim 27, wherein:
the one or more frames include one or more multicast frames.

32. The client station of claim 27, wherein the one or more integrated circuits are further configured to:
receive a probe response frame having information indicating that the communication device is connected to the AP as part of the WLAN.

* * * * *